Sept. 21, 1943.　　　L. C. FERGUSON　　　2,329,831
SCRAPER BLADE
Filed Aug. 3, 1940　　　2 Sheets-Sheet 1
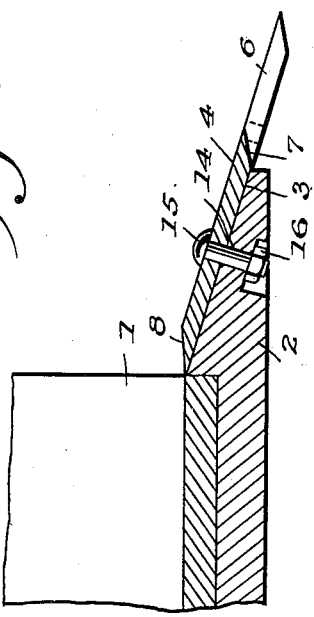
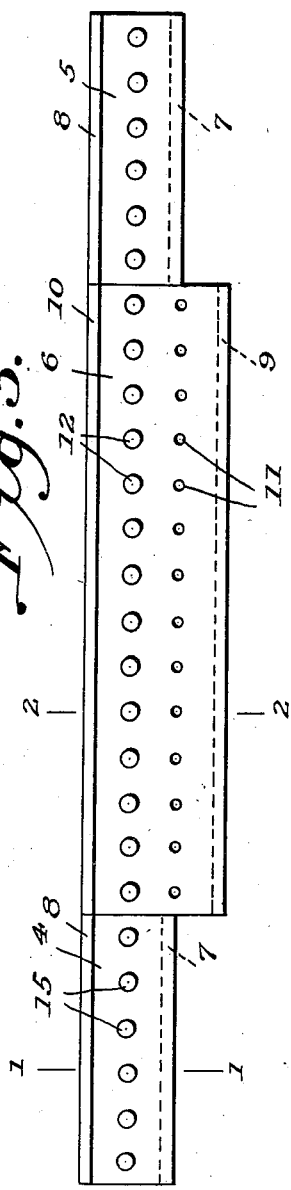
Inventor
LESTER C. FERGUSON
By Milans & Milans
Attorneys Sept. 21, 1943.  L. C. FERGUSON  2,329,831
SCRAPER BLADE
Filed Aug. 3, 1940  2 Sheets-Sheet 2
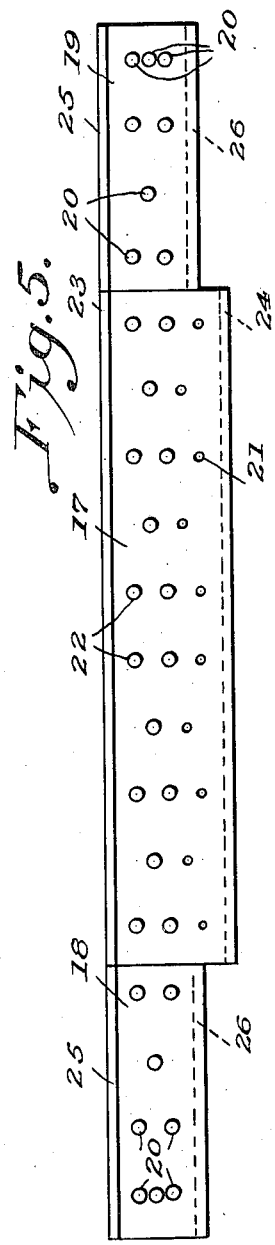
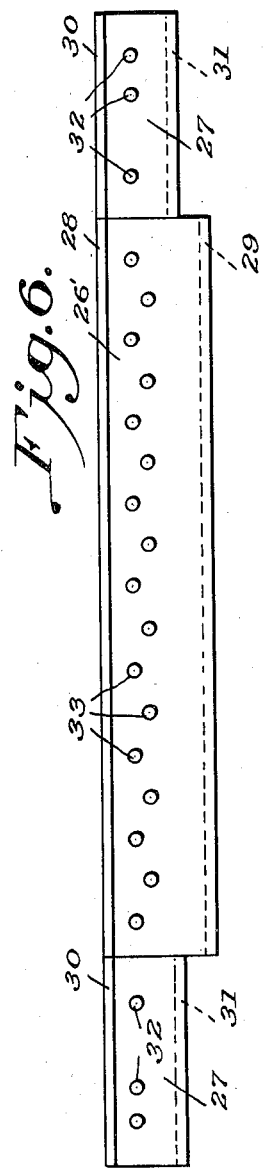
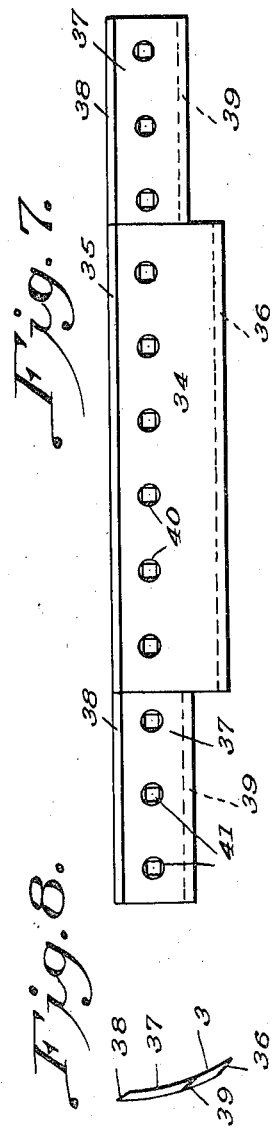
Inventor
LESTER C. FERGUSON
By Milans & Milans
Attorneys Patented Sept. 21, 1943

2,329,831

UNITED STATES PATENT OFFICE 2,329,831

SCRAPER BLADE

Lester C. Ferguson, Dallas, Tex.

Application August 3, 1940, Serial No. 350,837

2 Claims. (Cl. 37—141)

My invention relates to new and useful improvements in blades for scrapers, graders or the like and has for its principal object the provision of a blade including a plurality of sections, the intermediate section projecting forwardly of the end sections or being offset therefrom.

A further object of the invention consists in the provision of a blade formed of a plurality of sections, the intermediate section being adjustable so that its front or cutting edge may be positioned to project beyond the cutting edges of the end sections or in alignment therewith.

A further object of the invention resides in the provision of a blade of the character described formed of a plurality of sections, the cutting edge of the intermediate section normally projecting forwardly of the cutting edges of the end sections, and the sections being reversible to present different cutting edges.

Still another object of the invention consists in the provision of a blade for the purpose described formed of a plurality of sections, each of the sections being reversible to present different cutting edges and the intermediate section being adjustable rearwardly or forwardly with respect to the end sections so that the forward cutting edge of the intermediate section may be positioned forwardly of the forward cutting edges of the end sections or positioned on a straight line therewith.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a section through a portion of a scraper bucket and moldboard therefor, the section extending through one of the end sections of the scraper blade on the line 1—1 of Fig. 3.

Fig. 2 is a view similar to Fig. 1 through the intermediate section of the scraper blade on the line 2—2 of Fig. 3.

Fig. 3 is a top plan of the scraper blade shown in Figs. 1 and 2.

Fig. 4 is a front edge view of the scraper blade shown in Fig. 3.

Figs. 5, 6 and 7 are top plans of modified forms of scraper blade; and

Fig. 8 is an end view of the blade shown in Fig. 7 of the drawings.

As stated in the objects of my invention the improved form of scraper blade is adapted to be used in connection with various forms of scrapers or graders and in Figs. 1 and 2 of the drawings I have indicated at 1 a portion of a scraper bucket and at 2 a portion of an ordinary moldboard to which the blade is adapted to be attached, the upper projecting surface of the moldboard being inclined as shown at 3 to support the blade at a corresponding angle. The form of blade shown in Figs. 1, 2, 3 and 4 of the drawings includes the end sections 4 and 5 and the intermediate section 6, it being noted, more particularly in Figs. 3 and 4 of the drawings, that the adjacent ends of the sections abut, or in other words the inner ends of the end sections 4 and 5 abut with the ends of the intermediate sections 6. The longitudinal edges of the end sections are beveled as shown at 7 and 8 while the longitudinal edges of the intermediate sections 6 are beveled as shown at 9 and 10. As shown the intermediate section is of greater width, from beveled edge to beveled edge than the end sections 4 and 5 and normally it is intended to have the forward beveled edge 9 projecting beyond the beveled edges 7 of the end sections 4 and 5, but the intermediate section 6 may be adjusted rearwardly, as shown by dotted lines in Fig. 2 of the drawings, to bring the beveled edge 9 of the intermediate section 6 in alignment with the beveled edges 7 of the end sections 4 and 5. In order to accommodate for this adjustment just described the intermediate section is provided with two rows of longitudinally spaced perforations 11, the rows being spaced apart a distance equal to the spacing of the rows from the longitudinal edges of the section. I have illustrated, in Figs. 2 and 3 of the drawings, bolts 12 passing through the openings of the longitudinal row adjacent the beveled edge 10 and these bolts pass through the moldboard, as shown quite clearly in Fig. 2 of the drawings, and receive the nuts 13. When the bolts 12 are in the perforations of the row, adjacent the beveled edge 10, the forward beveled edge 9 of the section projects beyond the forward edges 7 of the end sections 4 and 5. If the intermediate section 6 is to be adjusted rearwardly into the dotted line position shown in Fig. 2 then the bolts 12 are removed from the openings in the row adjacent the edge 10, the section will be moved rearwardly, and the bolts repositioned in the openings 11, adjacent the beveled edge 9. This will bring the forward edge 9 of the intermediate section 6 in alignment with the forward edges 7 of the end sections 4 and 5.

Each of the end sections 4 and 5 is provided with a single row of perforations 14, extending longitudinally of the blade, centrally thereof, with respect to the edges 7 and 8. Bolts 15 are adapted to be positioned through these openings 14, to extend through openings in the moldboard 2, and receive the nuts 16.

In addition to having the intermediate sections 6 adjustable rearwardly or forwardly, with respect to the end sections 4 and 5, it will also be noted that each of the sections is reversible or adapted to be turned-over and when desired the sections of the blade may be reversed or turned-over to bring the beveled edges 8 of the end sections 4 and 5 forwardly and likewise the intermediate section 6 may be reversed or turned-over to bring the beveled edge 10 forwardly. In other words when I refer to reversing these sections I mean to turn them over so that the top and bottom surfaces are reversed. When the position of the intermediate section 6 is turned-over or reversed the bolts 12 will pass through the row of perforations 11, adjacent the edge 9, when the forward edge of the section projects forwardly or beyond the edges of the end sections and then when the intermediate section is moved rearwardly, to bring the forward edge thereof in alignment with the forward edges of the end sections, the bolts 12 will pass through the row of perforations adjacent the beveled edge 10.

In Fig. 5 of the drawings I have illustrated a slightly modified form of my invention in which the intermediate section of the blade is shown at 17 and the end sections at 18 and 19. The main difference in this modified form of the invention, over that shown in Figs. 1 to 4 inclusive of the drawings, is in the arrangement of the openings or perforations in the sections for receiving the bolts for securing the blade to the moldboard. In this modified form of the invention, shown in Fig. 5, each of the sections is reversible or adapted to be turned-over facewise to bring opposite cutting edges in position forwardly. At the same time the intermediate section 17 may be adjusted forwardly or rearwardly with respect to the end sections 18 and 19 so that the forward edge of the intermediate section 17 may extend beyond the forward edges of the end sections 18 and 19, as shown in Fig. 5, or brought into alignment therewith. At 20 I have illustrated bolts adapted for securing the end sections to the moldboard, openings being provided in the sections for receiving the same. It will be noted that the bolts are arranged in three rows and spaced longitudinally. This is found to be of advantage in securing the blade sections to certain forms of scrapers or graders. The intermediate section 17 of the blade is provided with five rows of longitudinally spaced openings 21 and I have shown bolts 22 positioned in openings of three rows, the three rows nearest the beveled cutting edge 23. When the intermediate section 17 is moved rearwardly to bring the beveled cutting edge 24 in alignment with the forward edges of the end sections 18 and 19, the bolts 22 will then be positioned in the three rows of openings 21 nearest the cutting edge 24. This arrangement of openings and bolts is found of advantage in some forms of devices on which the blade is used. The end sections 18 and 19 are formed with the opposite beveled cutting edges 25 and 26.

In the modified form of blade, shown in Fig. 6 of the drawings, the blade includes the intermediate section 26' and end sections 27, the longitudinal edges of the intermediate section 26" being beveled as shown at 28 and 29 while the longitudinal edges of the end sections are beveled as shown at 30 and 31. The end sections are secured to the moldboard or other part of the scraper or grader by bolts 32 while the intermediate section will be secured to the moldboard or other part of the scraper or grader by the bolts 33. In the blade, shown in Fig. 6, the sections are not reversible and neither is the intermediate section adjustable forwardly or rearwardly with respect to the end sections. However, in this form of blade, as in the other forms described, the forward cutting edge 29, of the intermediate section, projects forwardly or beyond the forward cutting edges 31 of the end sections 27.

In Figs. 7 and 8 of the drawings I have illustrated a still further modified form of the invention, the blade including the intermediate section 34 having the opposite beveled edges 35 and 36 and the end sections 37 having the opposite beveled edges 38 and 39. As shown more particularly in Fig. 8 of the drawings the sections are curved transversely. The intermediate section will be secured to the moldboard or other part of the scraper or grader by bolts 40 and the end sections 37 will be secured to the moldboard or other part of the scraper or grader by the bolts 41. As in the modified form of the invention shown in Fig. 6 of the drawings, the intermediate section of this modification shown in Figs. 7 and 8 is not adjustable forwardly or rearwardly of the end section 37 and the sections are not reversible. However, as in all of the previously described forms of the invention the forward cutting edge 36, of the intermediate section 34, projects forwardly or beyond the cutting edges 39 of the end sections 37.

In Figs. 3, 5, 6 and 7 I have shown the securing bolts in position in the openings of the sections of the blade although the bolts are not shown as passing through any portion of the moldboard or other part of the scraper or grader. However, the bolts have been illustrated to show the manner in which they will be arranged in the openings for securing the blades of the different forms to the supporting structures.

In reality the effective cutting edge of the blade is the forwardly positioned edge of the intermediate section, although the forward edges of the end sections will act as cutting edges for removing growth or the like above the surface. By reducing the length of the effective cutting edge of the blade, the scraper regardless of model or size is able to cut a thicker slice, thereby greatly reducing draft. This enables the scraper or grader to get a larger load, quicker in short distance, at a less operating fuel cost.

Having fully described my invention what I claim as new and desire to secure by Letters Patent is:

1. A scraper of the character described including end and intermediate sections, arranged end to end, the sections being reversible to present either longitudinal edge forwardly as an operative edge, and the intermediate section being adjustable in either of its positions forwardly and rearwardly with respect to the end sections, said intermediate section being of substantially greater depth than the end sections so that its rear edge will be in alignment with the corresponding edge of the end sections when the forward edge is projected.

2. A scraper of the character described including end and intermediate sections, each of the end sections having a single row of longitudinally spaced openings positioned centrally between the longitudinal edges of the section and the intermediate section being of greater width between its longitudinal edges than the end sections and having two rows of longitudinally spaced openings, the rows being spaced equal distances from opposite longitudinal edges of the section and the intermediate section being adjustable forwardly and rearwardly with respect to the end sections to position the forward edge of the intermediate section in advance of the forward edges of the end section or in alignment therewith, one row of perforations in the intermediate section being aligned with the rows of perforations in the end sections in either the forward or rearward adjustment of the intermediate section.

LESTER C. FERGUSON.